United States Patent [19]
Green

[11] 3,912,485
[45] Oct. 14, 1975

[54] GLASS MELTING FURNACE AND METHOD OF OPERATION

[75] Inventor: Charles F. Green, Toledo, Ohio

[73] Assignee: Libbey-Owens-Ford Company, Toledo, Ohio

[22] Filed: Oct. 19, 1973

[21] Appl. No.: 407,895

[52] U.S. Cl. .................... 65/136; 65/135; 65/337
[51] Int. Cl. ............................................. C03b 5/16
[58] Field of Search ............ 65/135, 136, 336, 337, 65/347; 251/305, 306, 307, 308

[56] References Cited
UNITED STATES PATENTS

| | | | |
|---|---|---|---|
| 2,010,064 | 8/1935 | Drake | 65/135 |
| 2,068,924 | 1/1937 | Mulholland | 65/135 |
| 3,675,681 | 7/1972 | Obermaier | 251/305 X |

Primary Examiner—Arthur D. Kellogg
Attorney, Agent, or Firm—Collins, Oberlin & Darr

[57] ABSTRACT

A regenerative furnace, and a method for increasing or decreasing the size of its glass melting area, including a tank provided with two sets of ports arranged along each of its longitudinal opposed side walls together with a regenerator for each set of ports. The regenerators are connected together by a common tunnel which alternately communicates with a source of combustion air and an exhaust flue. Damper means provided within the tunnel between the regenerators close off and regulate the flow of combustion air and the exhaust of hot waste gases from the one set of ports and its related regenerator to thereby control the firing of this set of ports for varying the size of the melting area and/or the temperature within the tank in its immediate area.

9 Claims, 6 Drawing Figures

GLASS MELTING FURNACE AND METHOD OF OPERATION

BACKGROUND OF THE INVENTION

1. Field of the Invention

The present invention relates generally to the art of glass melting, and more particularly to an improved apparatus and method for increasing or decreasing the melting capacity of a glass melting furnace, and for controlling the quality of glass produced by such a furnace.

2. Description of the Prior Art

It is accepted practice in the glass industry to rate the production capacity of a glass melting furnace in terms of its output per unit area of glass exposed to flames or gases of combustion. Thus, continuous glass melting furnaces are conventionally designed to produce definite tonnages of glass of related compositions and once these requirements are set, the dimensions of the tank and the number and size of the ports as well as its melting capacity, becomes generally fixed. For such furnaces to efficiently produce glass at low cost, they must be operated at or near their designed capacity. However, at various periods during a campaign, which is approximately four years of continuous operation for such furnaces, it becomes desirable to either increase or decrease the tonnages of glass and/or change the composition of the glass produced which, of course, changes the melting capacity required of the furnace.

In a conventional glass melting furnace, raw batch material and scrap glass, or cullet, are charged into one end of the furnace and molten glass is removed from its other end. The glass, in moving through the furnace, passes through a melting area of given size and a fining area which are contiguous with one another. Heat is applied over the upper surface of the bath of glass in both the melting and the fining areas. In such a furnace this addition of heat to the molten glass and the charging of relatively cold glass making materials establish varying temperatures in the bath of molten glass throughout the length of the tank. These variant temperatures, with other processes occurring in the tank, create a zone of maximum temperature commonly called a "hot spot". This hot spot normally occurs slightly downstream from the mid-point of the port area. One result of the temperature differential and resulting hot spot is that thermal or convection currents are established in the bath which are of such directions that rearwardly of the hot spot, the molten surface of the glass tends to flow towards the charging end of the tank and forwardly of the hot spot the molten surface of the glass tends to move towards the discharge end of the tank. These convection currents are useful in that they tend to create a barrier between the melting and the fining areas as well as stirring the molten glass in their respective areas. Thus, in a furnace having a specified number of ports fired simultaneously, the size of the melting area is relatively constant.

A number of methods have been proposed in the past for increasing the melting capacity of a specific size furnace by adding more heat to increase the melting rate of the raw batch material. For example, greater quantities of fuel have been burned in the intermediate port or ports with the result that the temperature is raised in the hot spot region. Alternatively, relatively more fuel has been burned at the downstream ports so that the hot spot location is moved downwardly of the tank toward the fining area in an attempt to increase the size of the melting area. However, although such means have been moderately successful, it is difficult by such means to maintain an accelerated rate of melting without damaging the furnace structure and thereby reducing its useful life.

In addition to the foregoing methods, furnaces have been provided with resistance heating means disposed in the molten glass bath at or adjacent to the hot spot to increase the melting capacity by releasing more energy as heat within the molten bath. Also, furnaces have been provided with cooling elements in selected areas adjacent the hot spot in the molten glass bath in an attempt to control and increase the magnitude of the convection currents circulating therein to increase its melting rate. These methods also have been only moderately successful in either increasing or decreasing the melting capacity of a given size furnace.

SUMMARY OF THE INVENTION

Generally speaking, a regenerative glass melting furnace according to this invention includes a tank which is provided with a plurality of ports along each of its longitudinally opposed sides. The ports along each side are divided into two sets by a pair of regenerators, together with damper valve means for regulating the flow of combustion air to and the exhaust of hot waste gases from one regenerator and its related port or ports.

One of the first set of ports consisting of a plurality of individual ports, is connected to one or the first regenerator and the other, or second, set of ports consisting of at least one port, is connected to the other or second regenerator located downstream of the first regenerator. The first and second regenerators are connected to a common tunnel which is alternately communicable with a source of combustion air and an exhaust flue.

A selectively adjustable damper valve is disposed in the tunnel between the first and second regenerators and is operable to regulate the flow of combustion air to, or exhaust hot waste gases from, the second set of ports and its related regenerator to control the firing thereof for the regulation of the size of the melting area of the tank and/or the temperature at the fining area. Means is provided to set the damper valve in preselected positions depending upon the desired firing of the furnace and to reverse its position when the furnace is cycled. In this furnace arrangement, the second regenerator and its related port or ports, can be employed to increase the size of the melting area in the tank, fired to provide an oxidizing flame at the fining area, or idled to limit the size of the tank's melting area to the first regenerator and its related set of ports.

OBJECTS AND ADVANTAGES

Thus, an object of this invention is to provide a continuous tank furnace with two sets of ports along two of its opposed sides together with means wherein the two sets of ports can be fired simultaneously to increase the size of the furnace melting area, or only one set of ports can be fired to reduce the size of the furnace's melting area.

A further object of this invention is to control the temperature gradient and the location of the hot spot of the molten glass along the length of the furnace by regulating the firing of preselected ports.

A further object of this invention is to provide means to regulate the flow of combustion air or the ratio of air to fuel and controlling the desired oxidizing condition and temperatures for optimum fining.

Another object of this invention is to provide a continuous tank furnace having a pair of regenerators connected to a common passageway, with damper means disposed in the common passageway between the regenerators which can be removed, repaired or replaced while the furnace is in operation.

Still other object of this invention is to provide the damper means with an adjustable operating means for setting the damper in preselected positions and which operating means is controllable with the furnace's reversing means so that the damper is simultaneously cycled therewith.

Other objects and advantages of the invention will become more apparent during the course of the following description when taken in connection with the accompanying drawings.

BRIEF DESCRIPTION OF THE DRAWINGS

In the drawings, wherein like numerals are employed to designate like parts throughout the same.

DESCRIPTION OF A PREFERRED EMBODIMENT

Figure 1:
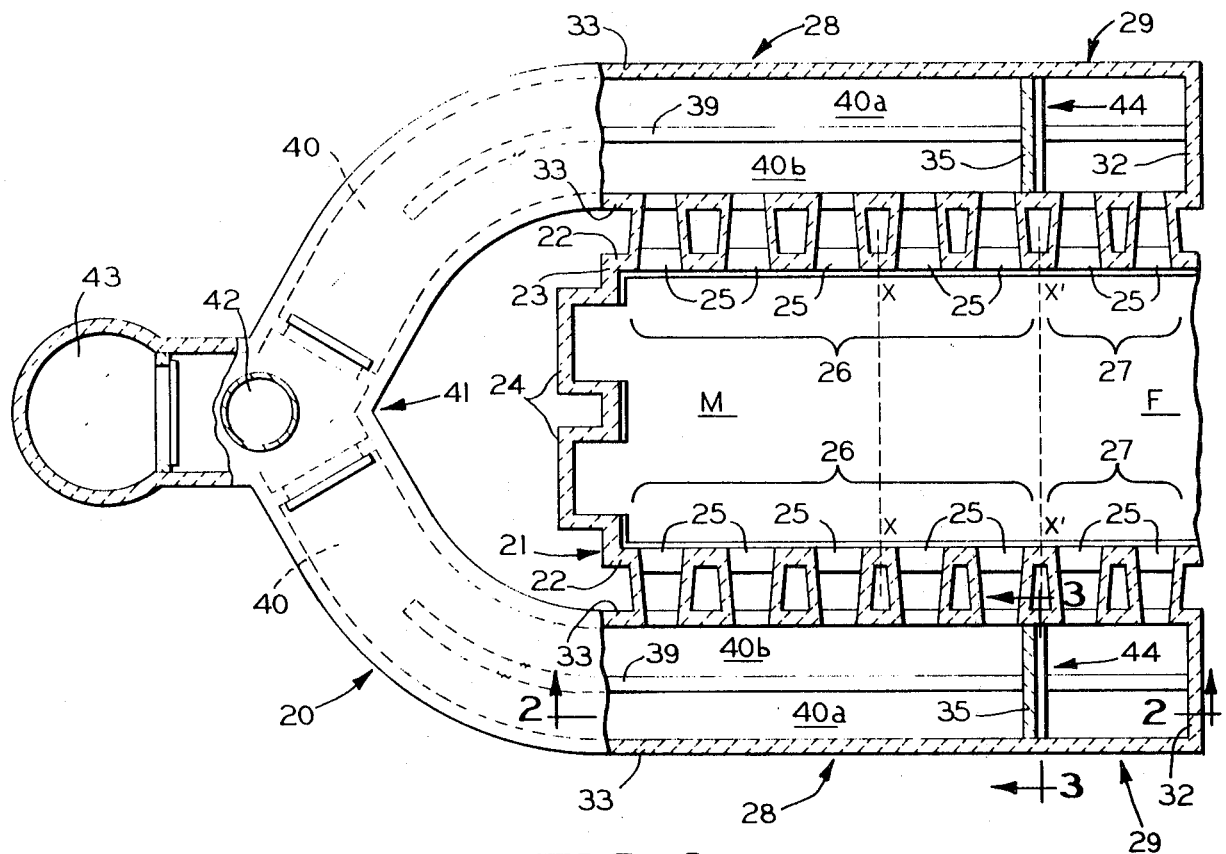
FIG. 1 is a fragmentary diagrammatic plan view of a regenerative furnace embodying this invention.

With reference to the drawings, and more particularly to FIG. 1, there is shown a continuous tank-type regenerative glass melting furnace 20 in combination with which the present invention is especially suitable. It will be appreciated, however, that the novel arrangement herein disclosed may be employed in melting furnaces other than that of a continuous tank-type glass furnace shown.

Generally, such a glass melting furnace 20 includes a longitudinally extending tank 21 having opposed side walls 22, an end wall 23 and conventional batch feeding or doghouse areas 24. Raw glass making materials or batch and cullet or scrap glass, are introduced into the doghouse 24 of the furnace 20 by feeder devices (not shown) and reduced to a molten state in a furnace melting zone M from which they flow into a refining zone F, and are thereafter removed from the opposite or exit end of the furnace as a homogeneous molten material. It will be readily understood that although the zone M is termed a melting zone, a portion of the fining action also takes place therein.

Heat for reducing the batch to molten glass within the melting zone M is provided by suitable means such as burners (not shown) which discharge hot flames and products of combustion through ports 25 opening into the melting tank above the level of the glass flowing therethrough. As is common with furnaces of this type, the ports 25 are arranged at spaced intervals along both sides of the furnace 20 and, as previously mentioned, the number of ports employed is predicated upon a predetermined maximum melting capacity set for the furnace 20. In this instance, seven such ports are provided in each side wall 22 of the furnace 20 with the port 25 nearest the doghouse 24 being identified as the first port and the remaining ports being similarly identified as the second through the seventh ports, consecutively, away from the doghouse 24.

According to this invention, a predetermined minimum melting capacity also is set for the furnace 20 so that the furnace can be operated efficiently at low tonnage requirements as well as at high tonnage requirements. To this end, the ports 25 along each side wall 22 are divided into two groups or sets 26 and 27 of ports by regenerators 28 and 29, respectively. In this case, the first set 26 of ports consisting of port numbers one through five communicate with the regenerator 28 to provide the furnace 20 with a minimum melting area M designated by a dotted line $x—x$, while the second set 27 of ports consisting of port numbers six and seven communicate with the regenerator 29 which, when operated in conjunction with the first set 26 of ports, provide the furnace 20 with a maximum melting area M designated by a dotted line $x'—x'$. These dotted lines, $x—x$ and $x'—x'$, besides showing the dividing line between the two different size melting and fining areas M and F, also roughly represent the center line of the hot spot region normally occurring in this type of furnace. Although, in the example shown, the furnace 20 is provided with a total of seven ports along each of its opposed sides which are divided into a first set of five ports and a second set of two ports, it will be appreciated that any number of ports and their division into sets may be employed without departing from the scope of this invention.

Figure 2:
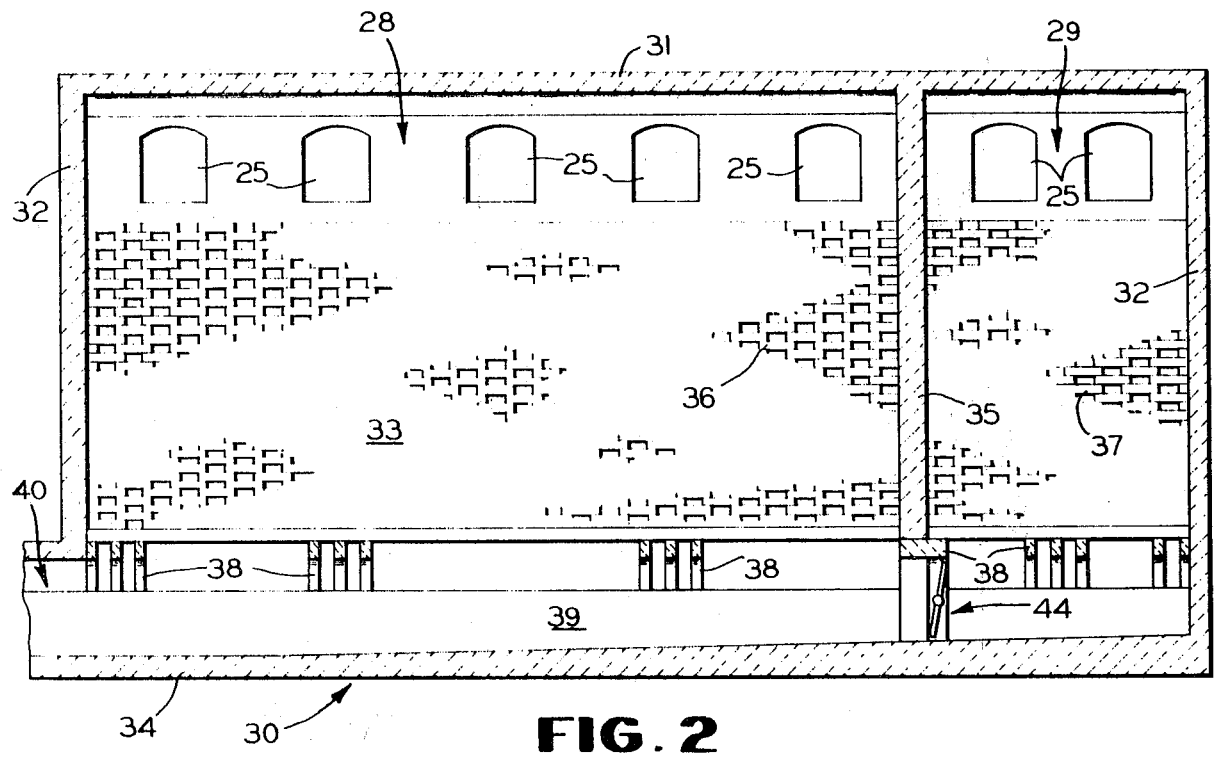
FIG. 2 is a longitudinal side elevation sectional view taken substantially along line 2—2 in FIG. 1 showing the location of the damper means in the tunnel and between the regenerators employed in this invention.

Referring now more particularly to FIG. 2, the regenerators 28 and 29 are conveniently contained within a unitary refractory brick housing 30 which includes a top or roof 31, end walls 32, side walls 33, and a bottom wall or floor 34. In the embodiment of the furnace 20 shown, a transverse vertical partition wall 35 is provided between the fifth and sixth ports to divide the housing 30 into two compartments for individually housing checker brick structures 36 and 37 of the regenerators 28 and 29, respectively. In order to adequately support the checker brick structures 36 and 37, as well as the partition wall 35, there is provided a plurality of longitudinally spaced transverse ceiling arches 38. However, in this case, since a single arch 38 spanning the width across the housing 30 becomes unduly large, two smaller arches 38a and 38b (see FIG. 3) are provided. The inner ends of these arches 38a and 38b are supported by a vertical wall 39 extending along the longitudinal center line of the floor 34. These ceiling arches 38a and 38b, together with the floor 34 and a portion of the side walls 33, form a tunnel or passageway 40 having two chambers 40a and 40b beneath the regenerators 28 and 29. It will be appreciated, however, that a single chamber tunnel 40 would suffice if it were not necessary for structural reasons to span the width across the housing 30 by two arches instead of a single arch.

As shown in FIG. 1, each tunnel 40 along the side walls 22 of the tank 21 is alternately connected in a well-known manner via a conventional reversing valve mechanism indicated generally by the reference numeral 41 to either a source (not shown) of combustion air via a passageway 42 or a chimney or exhaust flue 43.

Figure 3:
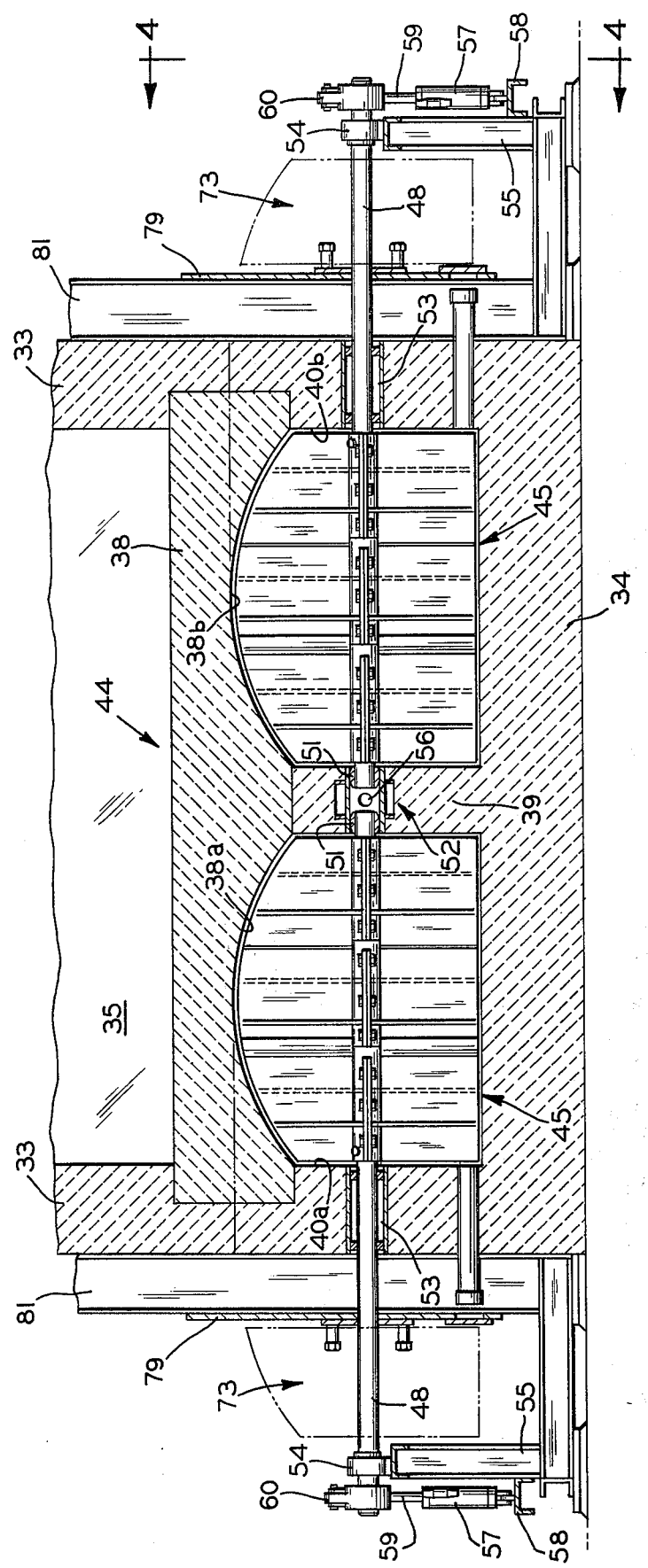
FIG. 3 is an enlarged transverse sectional view taken substantially along line 3—3 in FIG. 1 showing the damper in its closed position as well as its operating mechanism.

According to this invention and as shown in FIGS. 1 and 2, the supply of combustion air to and exhaust of hot waste gases from the second regenerator 29 and its related set 27 of ports, is regulated by a damper valve apparatus 44 provided in each tunnel 40 between the first and second regenerators 28 and 29. Although as shown in FIG. 3 the damper valve apparatus 44 comprises a pair of like butterfly valve devices 45, one extending transversely across each of the tunnel portions 40a and 40b, it will be appreciated that a single butterfly valve device would suffice if the tunnel 40 was not divided by the center support wall 39. Since these butterfly valve devices 45 are mirror images of each other, the same reference numerals are applied to the corresponding parts thereof.

Figure 5:
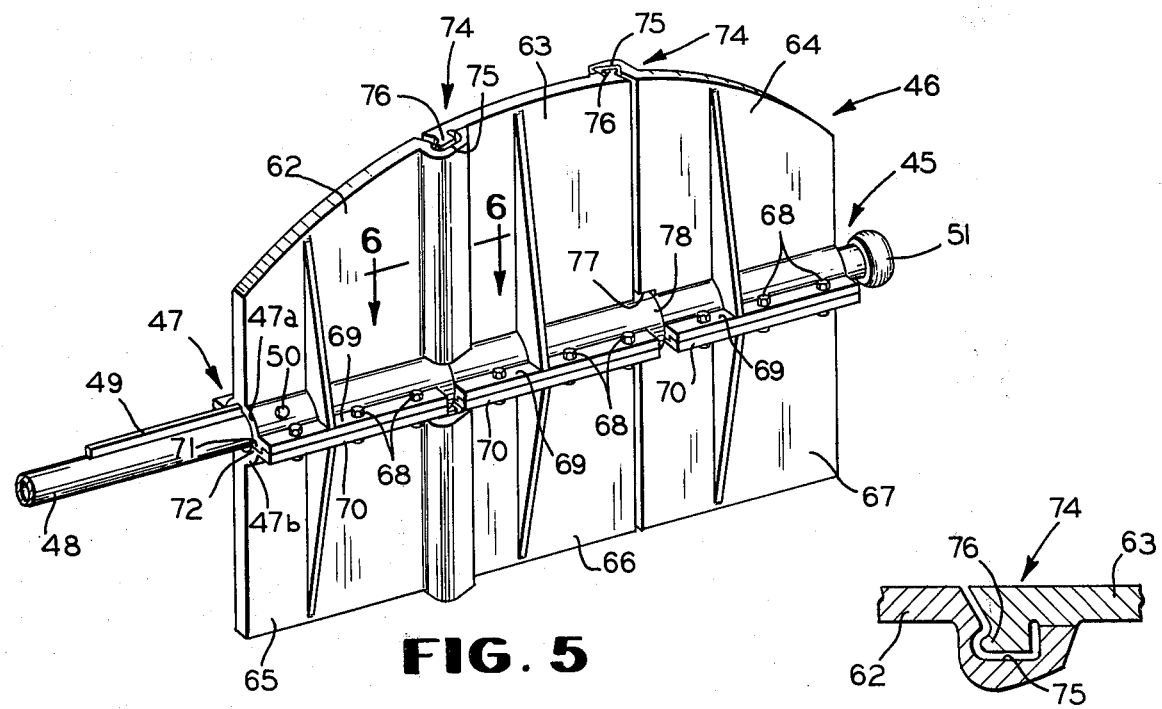
FIG. 5 is an enlarged perspective view of the damper and shaft arrangement employed in this invention.

Referring now more particularly to FIGS. 3 and 5, each butterfly valve device 45 includes a damper member 46 having a central hub 47 for mounting it on a rotatable hollow shaft 48 which extends across its respective tunnel portion and beyond the side wall 33, the purpose of which will be described hereinafter. The damper member 46 is keyed as indicated at 49 to the shaft 48 for rotation therewith. Also, the end of the hub 47 adjacent the side wall 33 may be provided with a lock bolt 50 to secure the damper 46 to the shaft 48 so as to prevent axial movement thereof relative to the side wall 33.

The shaft 48 has its inner end mounted in a spherical ball bushing 51 which is journalled in a center tube assembly 52 contained in the center support wall 39. The other or outer end of the shaft 48 passes through a seal type tube assembly 53 contained in the side wall 33 of the regenerator housing 30 and is rotatably journalled in a pillow block bearing 54 mounted on a pedestal 55 which is transversely spaced from the side wall 33. Because of the high operating temperatures required within the furnace 20 for reducing a raw batch to a molten bath, a cooling medium such as air is blown through the hollow shaft 48 to prevent the bushing 51 and the bearing 54 from seizing and/or binding in their sleeves or races. This cooling medium may be introduced into the outer end of the hollow shaft 48 by a conventional connection (not shown) and exhausted through an outlet port 56 provided in the center tube assembly 52 or vice versa.

Figure 4:
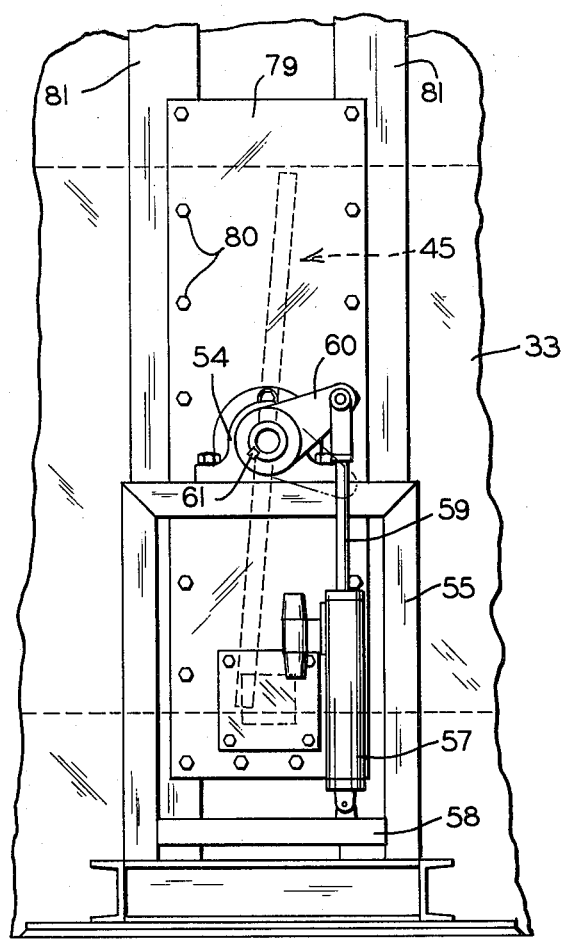
FIG. 4 is an enlarged elevational view taken substantially along line 4—4 in FIG. 3 further showing the damper operating mechanism.

Movement of the butterfly valve 45 between its fully opened and closed positions is provided by a conventional adjustable stroke pressure or power cylinder 57 (see FIGS. 3 and 4). This cylinder 57 is pivotally connected to a stationary frame 58 positioned outside of and adjacent to the pedestal 55, and its piston rod 59 is connected to a lever or crank arm 60 fixedly mounted on the outer end of the shaft 48 as by a key 61. The stroke of this cylinder 57 can be adjusted to oscillate the shaft 48 to any setting between these two positions.

Control means (not shown) are provided to actuate the cylinder 57 in synchronization with the reversing mechanism 41 of the furnace 20 so that the butterfly valve 45 is cycled with the cycling or reversing of the furnace 20. The power cylinder 57 may be provided with a limit switch (not shown) which indicates that the butterfly valve 45 has also cycled with cycling of the furnace 20.

Accordingly, the furnace 20 may be operated at low tonnages by fully closing the damper valve assemblies 44 and idling the second set 27 of ports. Firing of the furnace 20 is then confined to the first set 26 of five ports with the hot spot located between the third and fourth ports as indicated by the line $x—x$ which tends to define the end of the minimum size of the melting area M.

On the other hand, the damper valve assemblies 44 may be partially opened and the second set 27 of ports may be fired to maintain the temperature of the bath of molten glass constant as it leaves the melting area M. The primary firing in this instance is provided by the first set 26 of five ports. Also, the damper valves 44 may be regulated so that the flames provided by the second set 27 of ports are oxidizing in nature, thus improving the fining of the molten glass and its color characteristics.

When the furnace 20 is operated at high tonnages, the damper valve assembly 44 on the firing side of the furnace 20 may be fully opened and the damper valve assembly 44 on the exhaust side may be partially closed to reduce the flow of hot waste gases through the regenerator 29 and to thereby improve the heating of the checker brick structure 37 of this regenerator. In this case, the primary firing of the furnace 20 is provided by all seven ports and the hot spot is moved between the fifth and sixth ports as indicated by the line $x'—x'$ thereby increasing the melting area M to its maximum size.

Since the dimensions of the damper member 46 are very large, e.g., approximately 6 feet wide and 4 feet high with a weight of about 2,000 pounds, it is not feasible to fabricate it of one piece. Thus, as shown in FIG. 5, the damper member 46 includes three top segments or leaves 62, 63 and 64 positioned above the shaft 48 and three bottom segments or leaves 65, 66 and 67 positioned below the shaft 48. In this instance, the top and bottom leaves 62 and 65 are identified as the first set, the top and bottom leaves 63 and 66 as the second set, and the top and bottom leaves 64 and 67 as the third set. The bottom leaves 65 through 67 are secured to the top leaves 62 through 64 respectively, by bolt and nut assemblies 68 which pass through flanges 69 and 70 extending from hub portions 47a and 47b provided on the top and bottom leaves, respectively. The axially extending faces between the flanges 69 and 70 may be provided with cooperating tongues 71 and grooves 72, respectively, to lock the top and bottom leaves in a planar relationship.

As previously mentioned, the shaft 48 extends outside the wall 33 to the transversely spaced pedestal 55 and thus provides an open space 73 slightly larger in width than the width of each set of leaves externally of the tunnel chambers 40a and 40b (see FIG. 3). This space 73 is provided so that each set of leaves of the damper member 46 can be selectively moved along the shaft 48 into this space 73 for access thereto.

Figure 6:
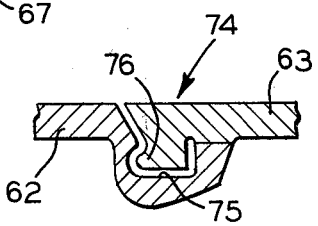
FIG. 6 is a fragmentary view, taken substantially along line 6—6 of FIG. 5 of one type of connection that may be employed between adjacent leafs making up a butterfly valve.

When the damper 46 is being removed from either of the tunnel chambers 40a or 40b, its sets of leaves are pulled along the shaft 48. Therefore, the edges between the adjacent sets of leaves are provided with coupling means 74. Accordingly, and as particularly shown in FIGS. 5 and 6, the right-hand edge when viewed in FIG. 5 of the first and second set of leaves, is provided with an offset portion containing a groove 75 and the adjacent left-hand edge of the second and third set of leaves is provided with a tongue 76 which projects into and cooperates with the groove 75 to pull the trailing sets of leaves along the shaft 48 when the first set of leaves is pulled into the space 73.

On the other hand, when a damper member 46 is being replaced in either of the tunnel chambers 40a or 40b, its sets of leaves are pushed along the shaft 48. Thus, the faces of the hubs 47 of the adjacent sets of leaves are provided with means to positively push the preceding sets of leaves along the shaft 48. In this case, the right-hand face (when viewed in FIG. 5) of the hub 47 of the first and second set of leaves is undercut as at 77 and the left-hand face of the hub 47 of the second and third set of leaves is provided with a portion 78 which projects into and contacts the face of the undercut portion 77 to positively push the preceding sets of leaves ahead thereof.

When a damper member 46 is to be removed from or replaced in the tunnel chambers 40a and 40b, a cover plate 79, secured as by bolts 80 to vertical structural supporting members 81 of the regenerator housing 30, and a portion of the refractory brick forming the regenerator side wall 33 are removed to provide an opening through which the damper 46 may pass. The lock bolt 50 securing the damper 46 against axial movement along the shaft 48 within its tunnel chamber is then released and the first set of leaves 62 and 65 is pulled into the open space 73 to the position indicated by the dotted lines in FIG. 3 where it can be disassembled from the shaft 48. The second set of leaves 63 and 66 is then pulled into the open space and so on until all the leaves of the damper member 46 have been repaired or replaced.

To reassemble the damper 46 on the shaft 48 and relocate it in either the tunnel chamber 40a or 40b, the third set of leaves 64 and 67 is first mounted on the shaft 48 in the open space 73 and pushed into the opening in the wall 33, then the second set of leaves 63 and 66 is positioned on the shaft 48 and coupled to the third set of leaves 64 and 67 and so on until the damper 46 is completely assembled. The damper 46 is then pushed into its operating position within its respective tunnel chamber and locked in place by the lock bolt 50.

From the foregoing, it can be seen that a novel arrangement has been provided wherein a furnace can be operated on a smaller number of ports for low tonnages and a higher number of ports for high tonnages, or somewhere in between for tonnage requirements between a designed minimum and maximum. In addition, the furnace can be operated so as to control the temperature and oxidizing condition of the flames at preselected ports for improving the quality of the glass produced.

It is to be understood that the form of the invention herewith shown and described is to be taken as an illustrative embodiment of the same, and that various changes and arrangements of the parts as well as various procedural changes may be resorted to without departing from the spirit of the invention.

I claim:

1. A method of firing a regenerative glass melting furnace for increasing and decreasing the size of its melting area, said furnace comprising a tank containing a bath of molten glass flowing successively from its charging end through melting and refining zones toward its exit end and including a first regenerator communicating with a first plurality of ports and a second regenerator downstream of said first regenerator and communicating with at least one additional port along a common side of said melting zone wherein the first plurality of ports may be fired alone or in combination with the at least one port to create a hot spot in the molten glass bath movable along the melting zone comprising the steps of:
   a. alternately supplying combustion air to, and exhausting hot waste gases from, said first and second regenerators via a common path; and
   b. controlling the flow of combustion air and hot waste gases in said common path between said first and said second regenerators to control the firing of said additional port communicating with said second regenerator.

2. A method of varying the size of the melting area of a regenerative glass melting furnace containing a bath of molten glass flowing successively from its charging end through melting and refining zones toward its exit end and including a first regenerator communicating with a first plurality of ports and a second regenerator communicating with at least one additional port along each side of the melting zone, comprising the steps of:
   a. sequentially applying combustion air initially to said first regenerator and then to said second regenerator along a common path on one side of said furnace;
   b. controlling the supply of combustion air along said common path to said second regenerator on said one side;
   c. exhausting hot waste gases from said first and said second regenerators into said common path on the opposite side of said furnace; and
   d. controlling the flow of hot waste gases from said second regenerator along said common path on the opposite side of said furnace whereby the size of the melting area of said furnace may be selectively increased and decreased.

3. In a reversing regenerative glass melting furnace including a tank containing a bath of molten glass flowing from its charging end successively through melting and refining zones toward its exit end, wherein the melting zone including a plurality of opposed ports on each of two sides of the tank and the ports on each side are alternately connectible to a source of combustion air and an exhaust flue, the improvement comprising:
   a. a first regenerator disposed on each side of said tank connected to a first group of said ports adjacent to each other and closest to the exit end of said tank;
   b. a second regenerator disposed on each side of said tank downstream from said first regenerator and connected to at least one additional port of said plurality of ports adjacent to the first group of said ports;

c. a tunnel disposed on each side of said tank commonly connected to said first and said second regenerator for placing said regenerators in communication with the source of combustion air and the exhaust flue; and d. means disposed in each said tunnel between said first and said second regenerators which alternately and selectively controls the flow of combustion air through each said tunnel to its said second regenerator and the exhaust of hot waste gases from said second regenerator through each said tunnel without interfering with the flow of gases to and from said first regenerators, whereby the size of the melting area of said tank may be selectively increased and decreased.

4. A glass melting furnace according to claim 3, wherein said control means comprises a butterfly valve movable between an open and a closed position.

5. A glass melting furnace according to claim 4, wherein said control means includes a rotatable shaft and said butterfly valve comprises a plurality of interfitting leafs which are removably clamped on said shaft.

6. A glass melting furnace according to claim 4, wherein said control means includes an adjustable operating means to move said butterfly valve between its open and closed positions.

7. A glass melting furnace according to claim 3, including means for cooling said control means.

8. A glass melting furnace according to claim 5, wherein said rotatable shaft is hollow and is provided with an inlet and an outlet through which a heat absorbing medium is passed.

9. A glass melting furnace according to claim 6, wherein said adjustable operating means is a variable stroke power cylinder.

* * * * *